(12) United States Patent
Mostazo Oviedo

(10) Patent No.: US 9,866,000 B2
(45) Date of Patent: Jan. 9, 2018

(54) CABLE LADDER

(71) Applicant: UNEX APARELLAJE ELECTRICO S.L., L'Hospitalet de Llobregat (ES)

(72) Inventor: Jose Antonio Mostazo Oviedo, Cornellà de Llobregat (ES)

(73) Assignee: UNEX APARELLAJE ELECTRICO S.L., L'Hospitalet de Llobregat (ES)

( * ) Notice: Subject to any disclaimer, the term of this patent is extended or adjusted under 35 U.S.C. 154(b) by 0 days.

(21) Appl. No.: 15/509,030

(22) PCT Filed: Sep. 22, 2015

(86) PCT No.: PCT/ES2015/070683
§ 371 (c)(1),
(2) Date: Mar. 6, 2017

(87) PCT Pub. No.: WO2016/046436
PCT Pub. Date: Mar. 31, 2016

(65) Prior Publication Data
US 2017/0279256 A1    Sep. 28, 2017

(30) Foreign Application Priority Data
Sep. 25, 2014   (ES) ................ 201431244 U

(51) Int. Cl.
*F16L 3/00*       (2006.01)
*H02G 3/04*       (2006.01)
(Continued)

(52) U.S. Cl.
CPC ......... *H02G 3/0456* (2013.01); *F16B 7/0473* (2013.01); *F16L 3/26* (2013.01)

(58) Field of Classification Search
CPC .. A47B 9/00; A47B 2200/0056; F16M 11/18; H02K 11/0042; H02K 11/0089; H02P 29/00
(Continued)

(56) References Cited

U.S. PATENT DOCUMENTS 3,618,882 A * 11/1971 Podedworny ............. F16L 3/00
                                                          248/68.1
3,915,420 A * 10/1975 Norris .................. H02G 3/0456
                                                            248/58
(Continued)

FOREIGN PATENT DOCUMENTS

DE      2549185     5/1976
EP      0119670     9/1984
(Continued)

OTHER PUBLICATIONS

International Search Report for PCT/ES2015/070683, dated Jan. 20, 2016.
(Continued)

*Primary Examiner* — Gwendolyn Baxter
(74) *Attorney, Agent, or Firm* — Staas & Halsey LLP

(57) ABSTRACT

A cable ladder formed by two side rails and crosspieces, all formed of extruded polymer material. The side rails have a channel receiving a corresponding end of the crosspieces. The channel has a lower rib and an upper rib. A projection of the lower rib or upper rib has openings along a longitudinal direction of the side rail. The ends of the crosspieces go through the opening of the projection and have a recess in which a corresponding portion of the channel is snap-fitted. The lower rib of the side rails is bent over itself along a bending line, such that a final section of the lower rib experiences downward expansion by elastic bending when the end of the crosspiece is introduced.

14 Claims, 10 Drawing Sheets

(51) Int. Cl.
  *F16L 3/26*  (2006.01)
  *F16B 7/04*  (2006.01)

(58) Field of Classification Search
  USPC .................................. 248/49, 68.1; 174/68.1
  See application file for complete search history.

(56) References Cited

U.S. PATENT DOCUMENTS

| | | | | |
|---|---|---|---|---|
| 4,046,343 | A * | 9/1977 | Kambara | H02G 3/0418 |
| | | | | 248/49 |
| 4,080,742 | A * | 3/1978 | Osterried | A63H 19/30 |
| | | | | 33/561.2 |
| 2015/0322987 | A1* | 11/2015 | Romano | F16L 3/26 |
| | | | | 248/49 |
| 2017/0110861 | A1* | 4/2017 | Ojerstav | H02G 3/0456 |

FOREIGN PATENT DOCUMENTS

| | | |
|---|---|---|
| EP | 0373021 | 6/1990 |
| ES | 1041681 | 7/1999 |
| ES | 2366108 A1 * | 10/2011 |
| GB | 2065989 | 7/1981 |

OTHER PUBLICATIONS

Written Opinion of the International Preliminary Examining Authority for PCT/ES2015/070683, dated Sep. 5, 2016.
Transmittal Letter for International Preliminary Examination Demand for PCT/ES2015/070683, dated Jul. 19, 2016.
Transmittal Letter for the Formal Response to the International Preliminary Examining Authority for PCT/ES2015/070683, dated Oct. 24, 2016.
International Preliminary Report on Patentability for PCT/ES2015/070683, dated Jan. 27, 2017.

* cited by examiner

CABLE LADDER

CROSS-REFERENCE TO RELATED APPLICATIONS

This application is a U.S. National Stage Application, which claims the benefit under 35 U.S.C. §371 of PCT International Patent Application No. PCT/ES2015/070683, filed Sep. 22, 2015, which claims the foreign priority benefit under 35 U.S.C. §119 of Spanish Patent Application No. 0201431244, filed Sep. 25, 2014, the contents of which are incorporated herein by reference.

FIELD OF THE INVENTION

The invention relates to a cable ladder formed by two parallel side rails attached to one another by a plurality of parallel crosspieces spaced from one another, said plurality of crosspieces forming a discontinuous support surface for cables. Particularly, the invention relates to a cable ladder of this type in which the side rails and the crosspieces have the following features:
each of the crosspieces is an extruded profile made of a polymer material;
each of the side rails is an extruded profile made of a polymer material having, on its inner side facing the other side rail, a channel receiving a corresponding end of said crosspiece;
the channel of the side rails is demarcated by a lower rib and an upper rib, said lower rib or said upper rib having at its end a projection extending towards the inside of the channel, and a plurality of openings spaced from one another along the longitudinal direction of the side rails being formed in one of said projections; and
each of the two ends of each of the crosspieces is formed such that it goes through said opening in the projection of the corresponding side rail and tightly fits in the channel of said side rail.

DESCRIPTION OF RELATED ART

Known cable ladders are generally made of metal, typically galvanized steel. The crosspieces are attached to the side rails by welding, rivetting or bending flanges, as shown in documents ES1041681U and ES236610861, for example.

Metal cable ladders have the drawback that the assembly operation, i.e., the operation of attaching the crosspieces to the side rails, tends to have a certain degree of difficulty and require specific tools. Furthermore, usually it is impossible to change the configuration of the cable ladder once it is assembled. In addition, it must be installed carefully in order to assure adequate electrical protection; particularly, it is necessary to assure that all the metal parts are properly grounded.

In addition, the applicant has developed and marketed trays, of the type of tray having a continuous bed, formed by a one-piece perforated or smooth tray with perforations to receive cable fastening means, in which the tray having a continuous bed is made entirely of an electrically insulating polymer material. These trays themselves provide secure electrical protection, which makes grounding the cable carrying installation unnecessary. However, these are not cable ladders, but rather perforated or smooth trays having a continuous bed, formed in one-piece.

Cable ladders made of polyester with fiberglass, in which the crosspieces are attached to the side rails by means of welding or gluing, or by using additional parts such as rivets, screws, etc., are available on the market.

Document EP0373021A1 discloses a cable ladder of the type indicated at the beginning, in which the side rails and the crosspieces are made of a polymer material. The crosspieces are fixed to the side rails by first introducing the end of the crosspiece in an opening of the side rail and said crosspiece is then moved parallel to the axis of the side rail to obtain a block by crimping.

SUMMARY OF THE INVENTION

The purpose of the invention is to provide a cable ladder of the type indicated at the beginning, offering greater ease in assembling the crosspieces. Another objective of the invention is to provide a cable ladder which has a low manufacturing cost and can be manufactured on an industrial scale. Finally, another objective of the invention is to allow manufacturing the cable ladder such that it provides secure and simplified electrical protection with respect to the state of the art.

This purpose is achieved by means of a cable ladder of the type indicated at the beginning, characterized in that said channel in the inner side of each side rail and the two ends of each of the crosspieces are formed such that each of said ends of the crosspiece fits and is snap-fitted into the channel of the corresponding side rail, and in that:
each of said ends of said crosspieces is provided with at least one recess in which a corresponding portion of said channel of the side rail is snap-fitted;
and said lower rib of said side rails is bent over itself along a bending line, such that a final section of said lower rib is a free end section which can experience a slight lowering by elastic bending with respect to said bending line, said slight lowering by elastic bending widening said channel of the side rail during introduction of the corresponding end of the crosspiece.

The polymer material making up the crosspieces and the side rails can be, for example, a thermoplastic, such as PVC, polycarbonate or polypropylene, as well as a heat-stable resin, such as fiberglass reinforced polyester. The chosen polymer material is preferably an electrical insulator. In addition, the polymer material making up the crosspieces can be the same as that of the side rails, or it can be provided that the side rails and the crosspieces are made of different materials.

The cable ladder can be manufactured on an industrial scale and at a low cost because the cable ladder according to the invention can be assembled with only two types of extruded parts, i.e., the two side rails that are advantageously identical and a repeated crosspiece. In addition, assembling the cable ladder, which is performed by means of simply snap-fitting these parts together, is much simpler than in the known state of the art which requires welding, rivetting or bending metal flanges. Likewise, making the cable ladder by means of extruded profiles made of a polymer material, which are attached by snap-fitting to one another without having to use attachment parts prevents problems of grounding the cable ladder, and furthermore allows sizing and forming these profiles so that the cable ladder has a suitable mechanical strength and offers at least the same cable fastening possibilities as the cable ladders of the state of the art. Finally, the fact that all the components of the cable ladder are made of an extruded polymer material allows easily choosing this material such that it is an electrical insulator, such that the cable ladder itself assures the electrical insulation of the cables without having to ground it. In addition, the configuration of the channel of the side rails forms a guide making the operations of placing the crosspieces and fixing them to the side rails by simple snap-fitting easier. Furthermore, the slight elastic lowering which the free end section of the lower rib can experience as a result of it being bent over itself along a bending line, allows widening the channel of the side rail during introduction of the end of the crosspiece, making the operation of introducing the end of the crosspiece easier, and provides a robust snap-fitting system at the same time.

Preferred embodiments the features of which are described in the dependent claims have been provided based on the invention defined in the main claim.

Said recesses at each of the ends of the crosspiece preferably consist of a groove transversely traversing the crosspiece. This solution is easy to carry out by means of machining the extruded profile forming the crosspiece, and provides firm anchoring of the end of the crosspiece in the channel of the side rail. Furthermore, the groove can easily be made on two opposite faces of the extruded profile even though these faces have a different geometry.

In some embodiments that have been provided, the portion of the channel of the side rail which is snap-fitted in the recess is one of the projections of the lower rib or of the upper rib of the channel of the side rail.

In other alternative embodiments, the portion of the channel of the side rail which is snap-fitted in the recess is a protuberance formed inside the channel of the side rail.

The crosspieces of the cable ladder are preferably provided with through holes for receiving cable fastening means. Particularly, these through holes allow the passage of common clamps with which the cables are fastened.

The crosspieces of the cable ladder are preferably provided with a hollow longitudinal rail open on a first side of the crosspiece. This geometry of the profile allows housing another type of fastening means for cables, particularly fastening means that snap into the hollow rail of the crosspieces and can be fixed at any point along the length of the crosspiece.

In the cable ladder, the through holes for receiving cable fastening means described above are preferably on the opposite side with respect to said first side of the crosspieces on which the hollow rail opens.

In some embodiments, the two ends of each of the crosspieces are formed such that each of said ends of the crosspiece fits and is snap-fitted into the channel of the corresponding side rail, both in a first position of the crosspiece and in a second position in which said crosspiece is turned 180° with respect to the first position. This configuration allows using a single crosspiece model and assembling it along the cable ladder alternately in both positions, such that the person performing the installation can use, in one and the same cable ladder section, different cable fixing systems provided on different sides of the crosspiece.

In the cable ladder, each end of the crosspieces preferably comprises two recesses: a first recess on a first side of the crosspiece and a second recess on a second side of the crosspiece opposite said first side, the first recess and the second recess being formed such that the portion of the channel of the side rail is alternately snap-fitted into each of them, when the crosspiece is alternately located in the first position or in the second position. These first and second recesses do not have to have an identical shape, but rather only respective shapes that are compatible with the snapping of each recess with one and the same portion of the channel of the side rail. As a result of this configuration, snap-fitting the end of the crosspiece into the channel of the side rail is done the same way for the two positions of the crosspiece, which makes assembly operations easier.

In another alternative embodiment, each end of the crosspieces comprises a window formed on one side of the crosspiece, one of the recesses being arranged on the opposite side of said crosspiece, and the projection in the lower rib of the side rails has two openings demarcating between them a finger which is snapped into the window.

This configuration particularly makes the operation of introducing the end of the crosspiece in the channel of the side rail easier.

The bottom of the channel of the side rails preferably forms an inner wall on which the end of the corresponding crosspiece is supported when it is fitted and snap-fitted into said channel. A very secure fastening between the crosspieces and the side rails is thus provided.

In one embodiment, in each of the two side rails the bending line is in a protruding position in opposite direction with respect to the other one of the two side rails, such that the final free end section of the lower rib extends from the bending line towards the other side rail. This solution allows advantageously implementing embodiments in which the portion of the channel of the side rail which is snap-fitted in the recess of the end of the crosspiece is one of the projections of said lower rib or upper rib.

In another alternative embodiment, in each of the two side rails the bending line is in a protruding position towards the other one of the two side rails, such that the final free end section of the lower rib extends from the bending line away from the other side rail. This solution allows advantageously implementing embodiments in which the portion of the channel of the side rail which is snap-fitted into the recess of the end of the crosspiece is a protuberance formed inside the channel of the side rail.

The protuberance formed inside the channel of the side rail in which the recess of the crosspiece is snap-fitted is preferably formed at the end of the final free end section of the lower rib, which is the point of maximum movement when the lower rib experiences slight lowering by bending.

The invention also covers other detail features illustrated in the detailed description of an embodiment of the invention and in the attached drawings.

BRIEF DESCRIPTION OF THE DRAWINGS

The advantages and features of the invention can be seen from the following description in which preferred embodiments of the invention are described in reference to the drawings in a non-limiting manner with respect to the scope of the main claim.

DETAILED DESCRIPTION OF EMBODIMENTS

Figure 1:
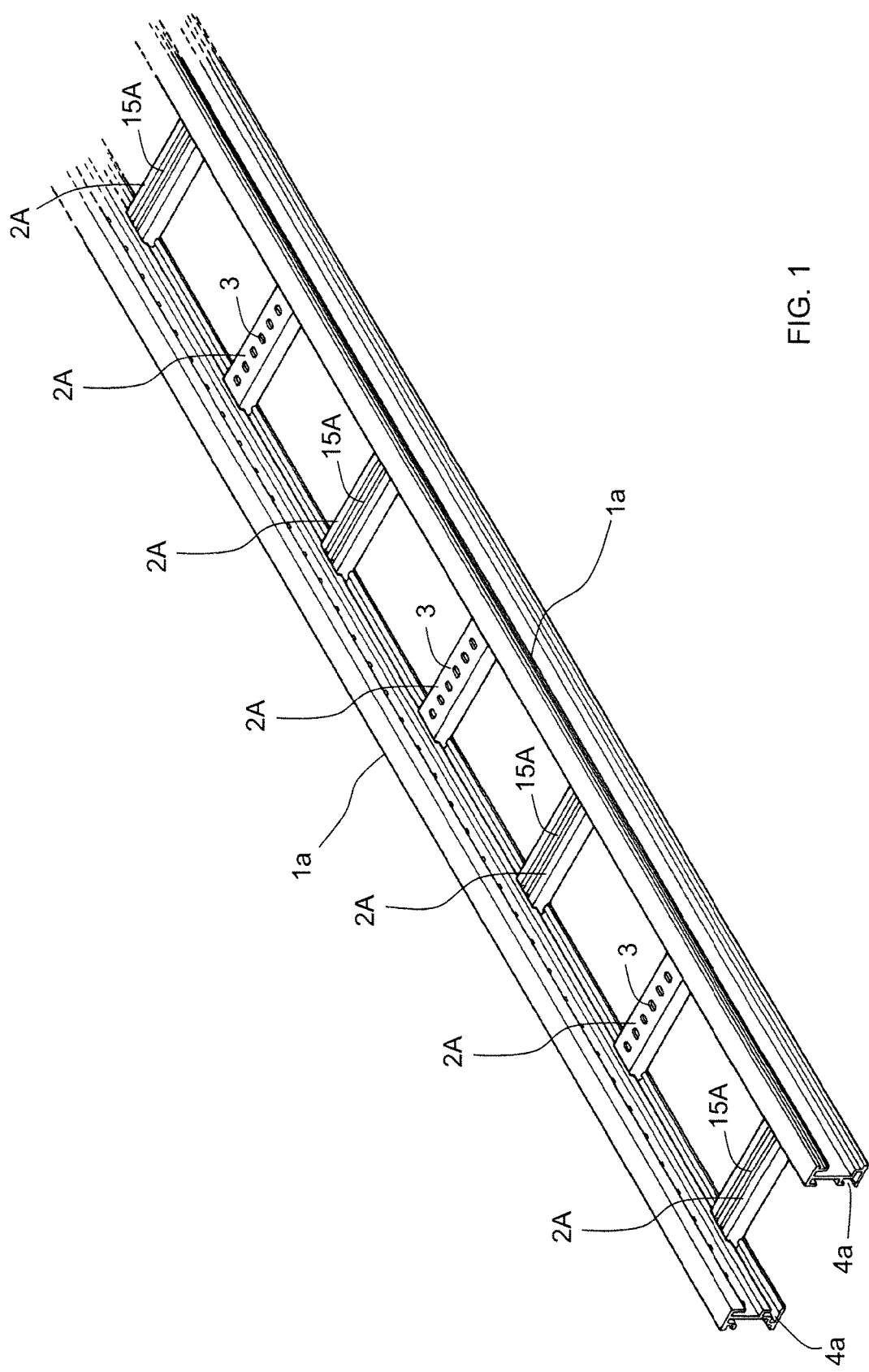
FIG. 1 is a perspective view of a cable ladder according to a first embodiment of the invention, in an assembled position.
Figure 2:
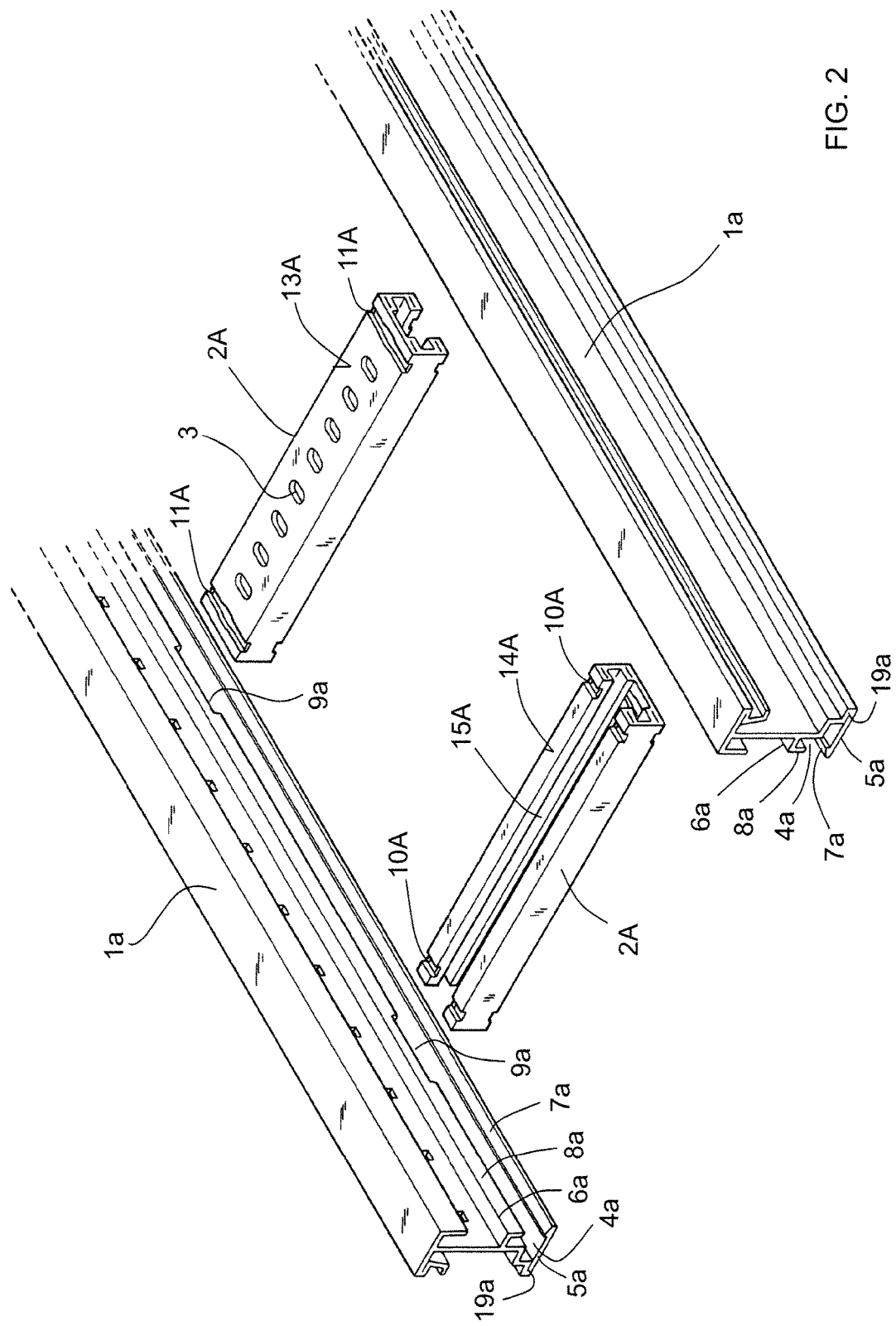
FIG. 2 is an enlarged partial view of FIG. 1, showing a final section of the cable ladder disassembled.
Figure 3:
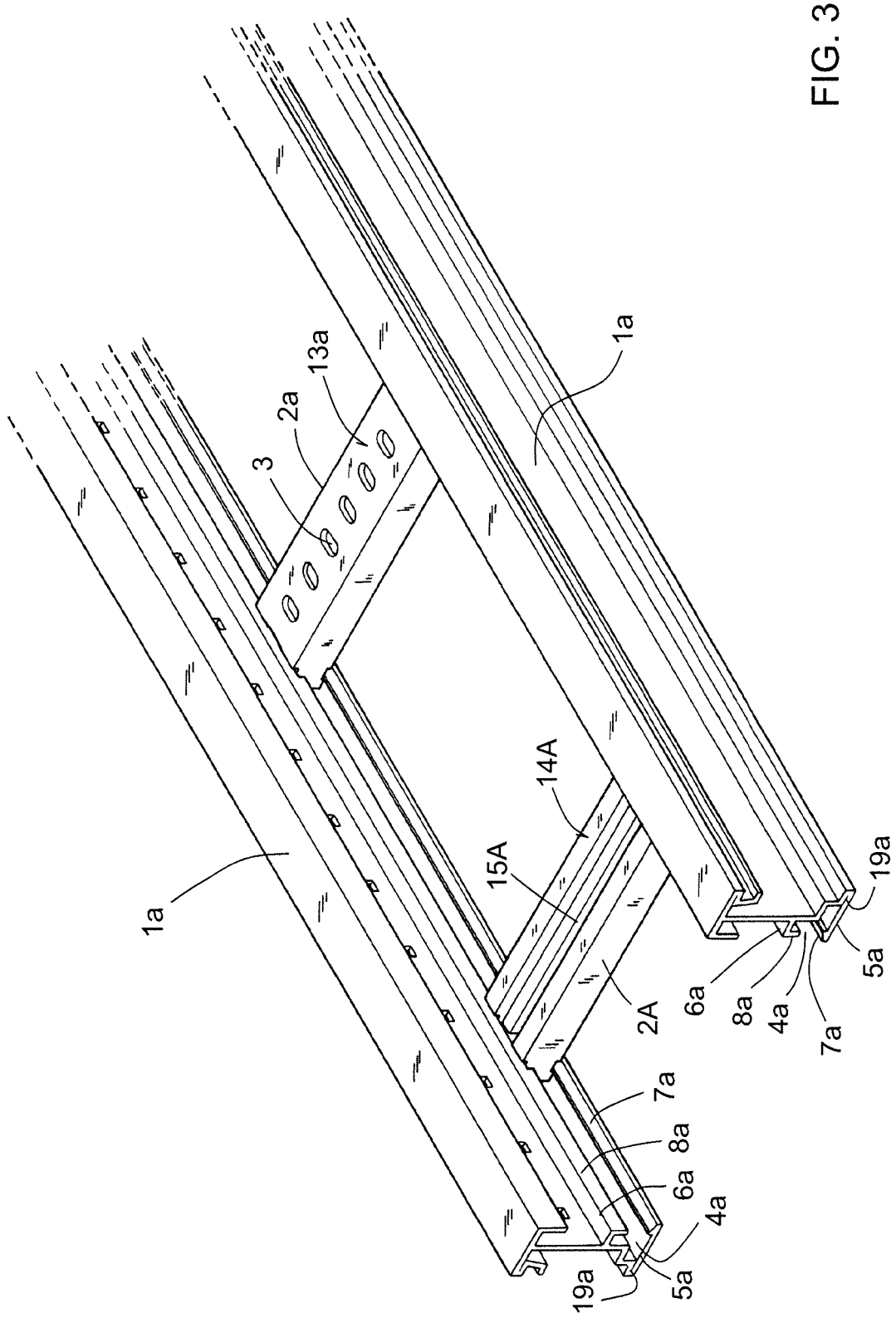
FIG. 3 is a view corresponding to that of FIG. 2, with the cable ladder in an assembled position.

FIGS. 1 to 4 show a first embodiment of a cable ladder according to the invention. As can be seen in FIG. 1, the cable ladder is formed by two parallel side rails 1a attached to one another by a plurality of parallel crosspieces 2A regularly spaced from one another. The two side rails 1a are identical and are placed symmetrically with respect to one another. Each of them consists of an extruded profile made of a polymer material. An electrically insulating material with a surface resistivity greater than 100 MΩ, such as PVC (polyvinyl chloride), for example, is preferably chosen as the polymer material. The crosspieces 2A are all identical and also consist of an extruded profile made of the same material as the side rails 1a. Like in the cable ladders of the state of the art, the assembly of crosspieces 2A forms a discontinuous support surface for cables, on which cables held by the cable ladder are laid. The person performing the installation can fix, at their own discretion, the cables to the crosspieces 2A using different fastening means (not depicted). To that end, it has on one side 13A of the crosspiece 2A through holes 3 regularly distributed along same, and on the opposite side 14A of the crosspiece 2A a hollow longitudinal rail 15A open on said opposite side 14A. The through holes 3 allow using a common clamp as cable fastening means, whereas the rail 15A allows using a cable fastening part that fits in a sliding manner in said rail 15A and can be fixed in any position along same. As can be seen in FIGS. 1 and 3, the crosspieces 2A are preferably alternately assembled in positions turned 180°, such that the through holes 3 and the rails 15A are alternately provided on one and the same face of the cable ladder in successive crosspieces 2A. This assembly is performed very easily because, as will be seen in detail below, the ends of the crosspiece 2A fit and are snap-fitted into a channel 4a of each side rail 1a, both in a first position of the crosspiece 2A, in which the through holes 3 are arranged in an upper face of the cable ladder, and in a second position of said crosspiece 2A turned 180°, in which the rail 15A is arranged in said upper face.

Figure 4:
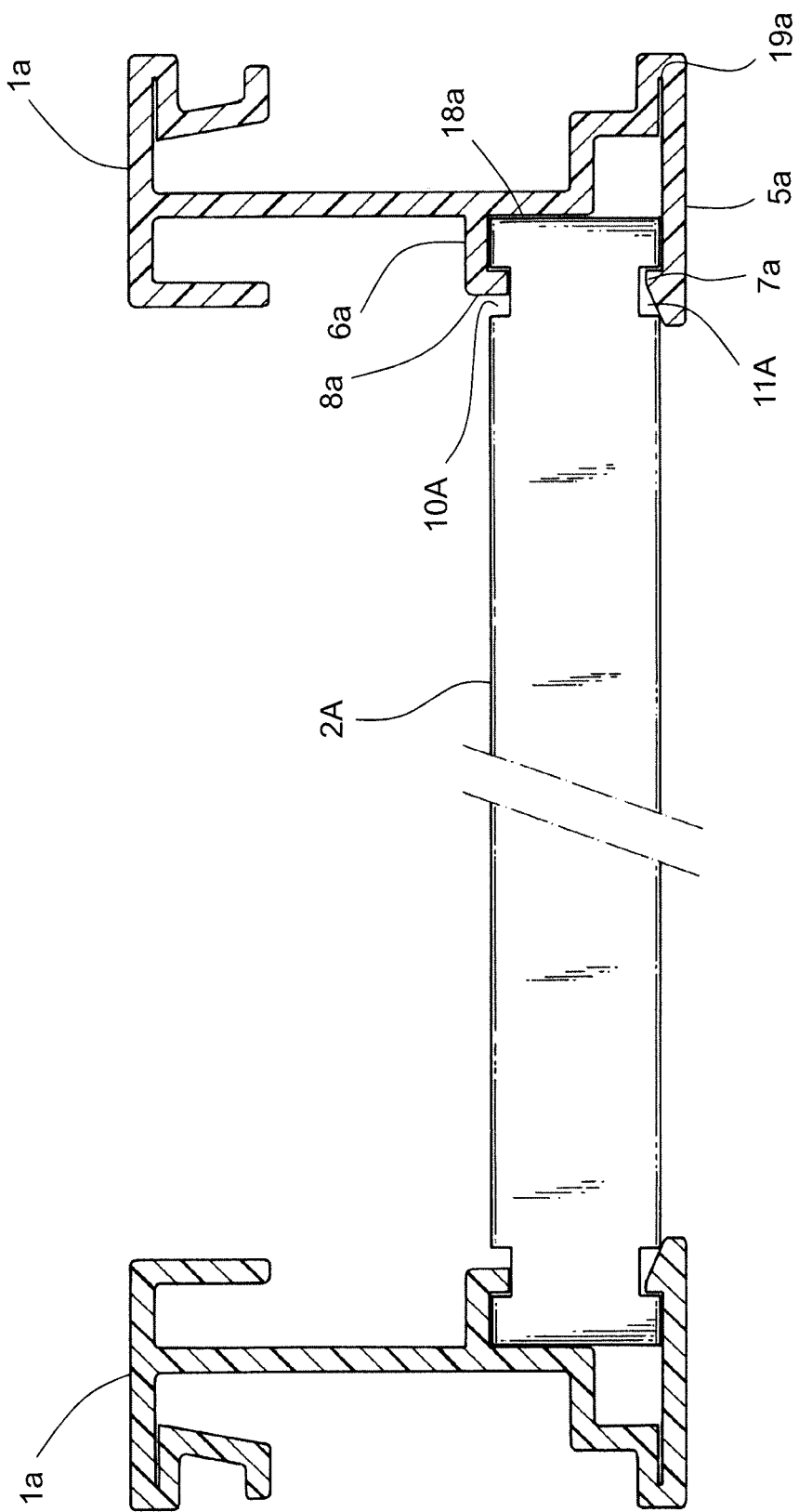
FIG. 4 is a profile view of this first embodiment of the cable ladder, in which the side rails have been depicted sectioned along a plane going through the central axis of a crosspiece.

As can be seen in greater detail in FIGS. 2 and 4, each of the side rails 1a has, on its inner side facing the other side rail 1a, a channel 4a receiving a corresponding end of the crosspiece 2A. The channel 4a is demarcated by a lower rib 5a and an upper rib 6a. The lower rib 5a and the upper rib 6a have at their end a projection, respectively 7a and 8a, extending towards the inside of the channel 4a. The projection 7a at the end of the lower rib 5a is a finger extending uninterruptedly along the side rail 1a. The projection 8a at the end of the upper rib 6a is a right flange also extending along the side rail 1a, but is interrupted at regular intervals by rectangular openings 9a, with a width substantially equal to that of the crosspiece 2A and a height slightly less than that of said right flange or projection 8a. The lower rib 5a is bent over itself along a bending line 19a such that a final section of said lower rib 5a is a free end section. This bending line 19a is in a protruding position in opposite direction with respect to the other side rail 1a, such that the final free end section of the lower rib 5a extends from said bending line 19a towards the other side rail 1a. As can be seen particularly in FIG. 4, the bottom of the channel 4a forms an inner wall 18a on which the end of the corresponding crosspiece 2A is supported when it is fitted and snap-fitted into said channel 4a.

Each crosspiece 2A is a C-shaped profile, in which the larger full face is perforated to form the through holes 3, whereas the open opposite face forms the rail 15A. Each of the two ends of the crosspiece 2A is formed such that it goes through the opening 9a formed in the projection 8a of the side rail 1a and tightly fits in the channel 4a. Furthermore, each of said ends of the crosspiece 2A is provided with a first recess 10A on the side forming the rail 15A, and with a second recess 11A on the side provided with the through holes 3. Both the first recess 10A and the second recess 11A consist of a groove transversely traversing the crosspiece 2A. These two grooves have the same section and are arranged in the same position with respect to the longitudinal direction of the side rail 2A. The only difference between them is that the groove forming projection 11A is continuous, whereas the groove forming projection 10A is interrupted by the rail 15A.

As mentioned above, the crosspiece 2A can be arranged in two positions turned 180° with respect to one another. In each of these two positions, the end of the crosspiece 2A fits and is snap-fitted into the channel 4a of the corresponding side rail 1a. Particularly, in each of these two positions one and the same portion of the channel 4a, specifically projection 7a in the lower rib 5a, is snap-fitted in the groove forming the recess 10A or in the groove forming the recess 11A, according to the position of the crosspiece 2A. Furthermore, the opening 9a preferably has a height slightly less than that of the right flange forming the projection 8a of the upper rib 6b, such that at the level of said opening 9a, said projection 8a has a reduced height and is likewise snap-fitted in the groove forming the recess 10A or in the groove forming the recess 11A, according to the position of the crosspiece 2A, as seen in FIG. 4.

Figure 5:
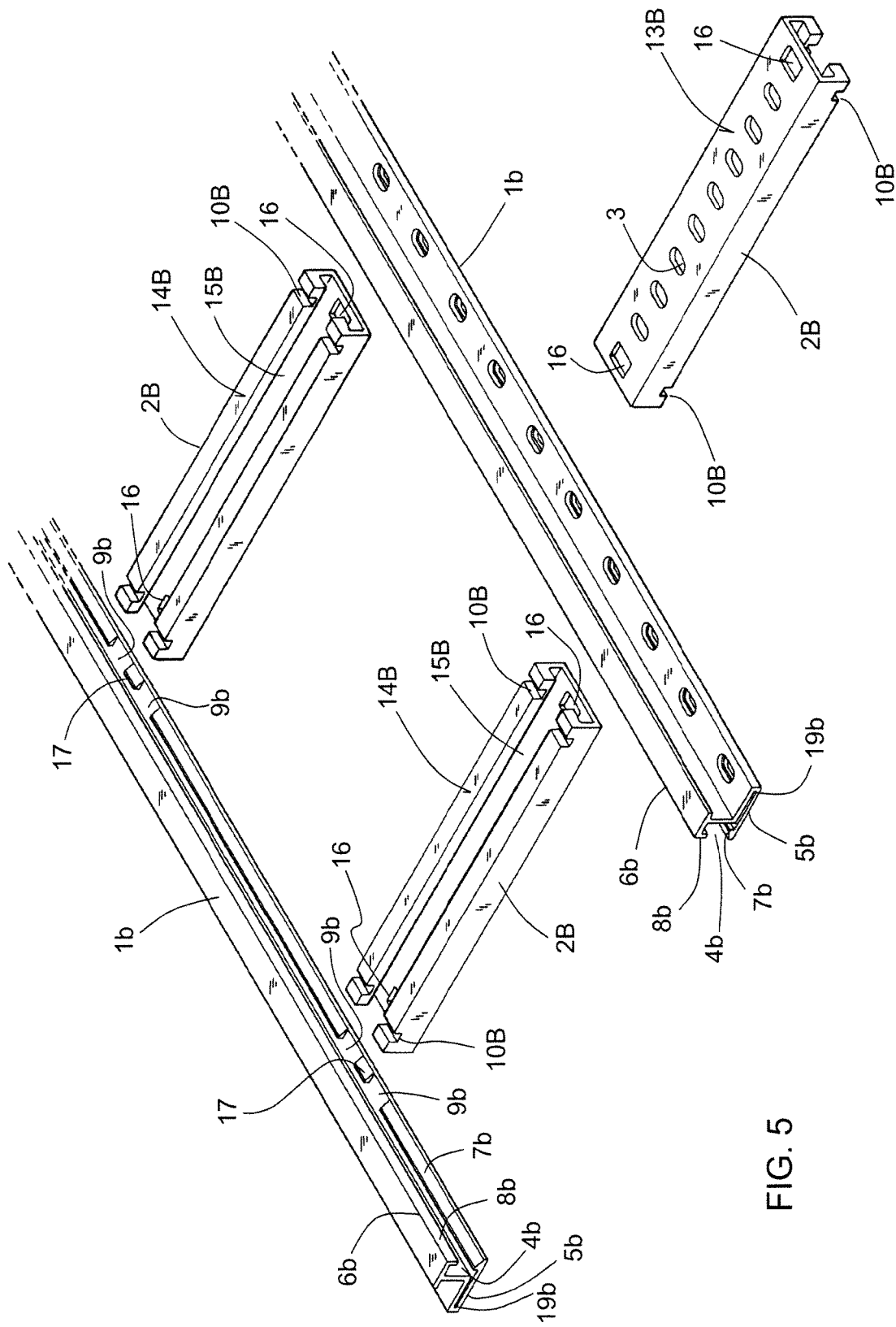
FIG. 5 is a view similar to that of FIG. 2, showing a second embodiment of the cable ladder according to the invention; one of the crosspieces has been depicted alone in a turned over position in this drawing.
Figure 6:
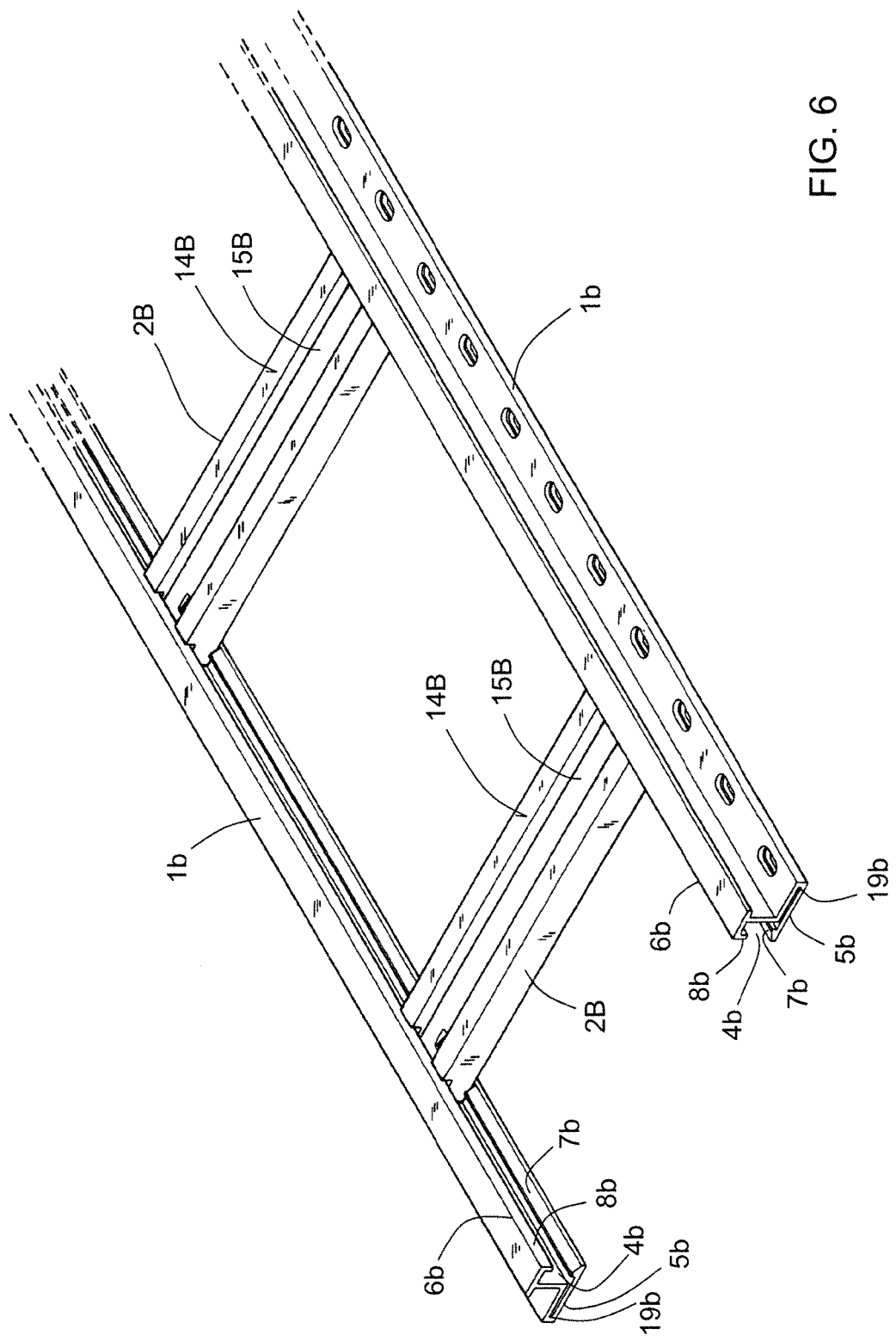
FIG. 6 is a view corresponding to that of FIG. 5, with the cable ladder in an assembled position.
Figure 7:
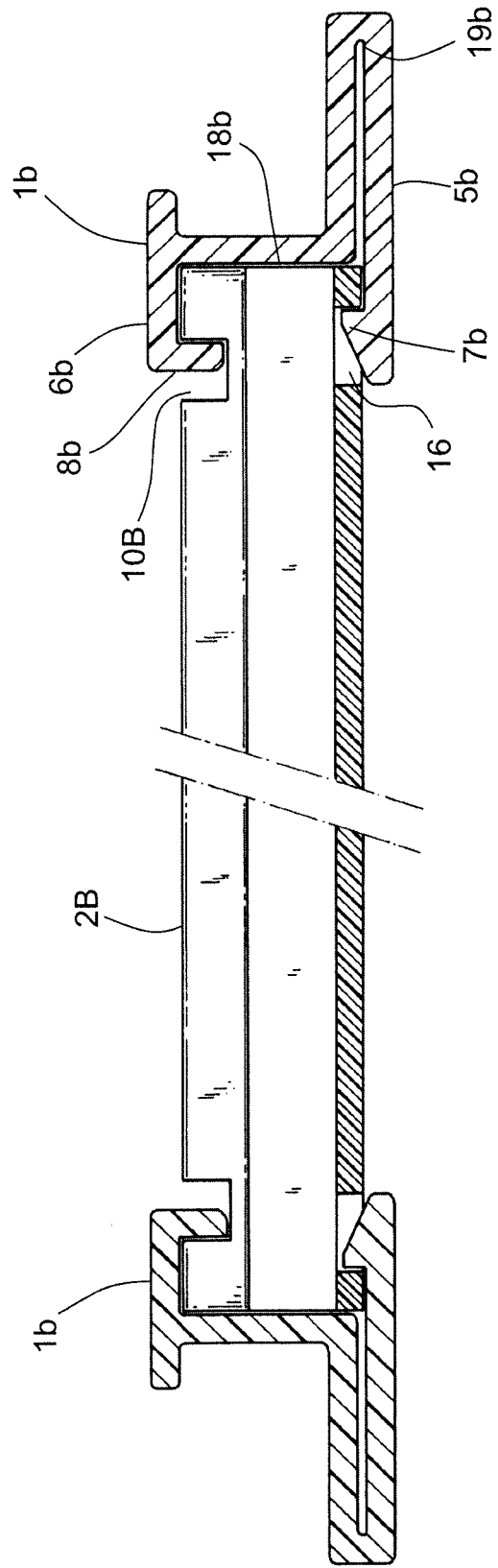
FIG. 7 is a profile view of the second embodiment of the cable ladder, in which the side rails have been depicted sectioned along a plane going through the central axis of a crosspiece.

FIGS. 5 to 7 show a second embodiment having the same general configuration as the first embodiment: the cable ladder is formed by two identical side rails 1b placed symmetrically with respect to one another, and a plurality of identical crosspieces 2B, all of them being extruded PVC profiles. In the drawings, the elements of the side rails 1b similar to those of the side rails 1a of the first embodiment are designated with the same reference numbers but with the suffix "b" instead of "a". Likewise, the elements of the crosspieces 2B similar to those of the crosspieces 2A of the first embodiment are designated with the same reference numbers but with the suffix "B" instead of "A". The differences with respect to the first embodiment are as follows:

in the channel 4b of the side rails 1b, the right flange forming the projection 8b of the upper rib 6b does not have openings, such that it extends uninterruptedly along the side rail 1b, whereas the continuous finger forming the projection 7b in the lower rib 5b is interrupted by the openings 9b, which are arranged in pairs demarcating between them a short finger 17 which is snap-fitted in a window 16 formed at the end of the crosspiece 2B;

the crosspieces 2B do not have a transverse groove on the side 13B; the window 16 in which the short finger 17 is snap-fitted has been arranged in its place;

the crosspiece 2B can only be placed in the position shown in the drawings; it is not possible to suitably fit it in the side rail 1b in a position turned 180°;

as can be seen in FIGS. 6 and 7, when the end of the crosspiece 2B is fitted and snap-fitted into the channel 4b of the side rail 1b, the short finger 17 of the lower rib 5b is snap-fitted in the window 16 on the side 13B of the crosspiece 2B, whereas the right flange forming the projection 8b in the upper rib 6b is snap-fitted in the transverse groove forming the recess 10B on the other side 14B of the crosspiece 2B.

Figure 8:
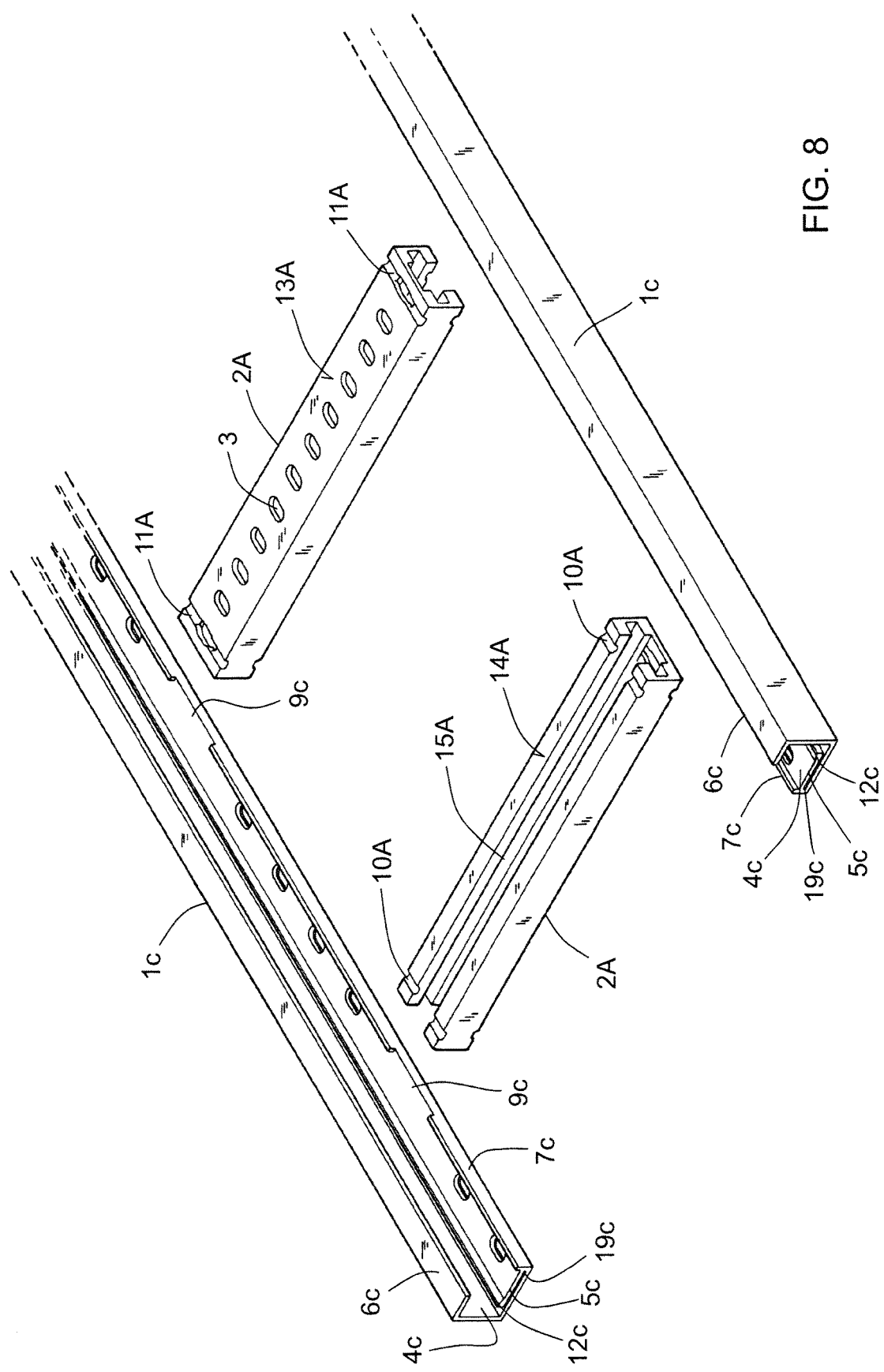
FIG. 8 is a view similar to that FIG. 2, showing a third embodiment of the cable ladder according to the invention.
Figure 9:
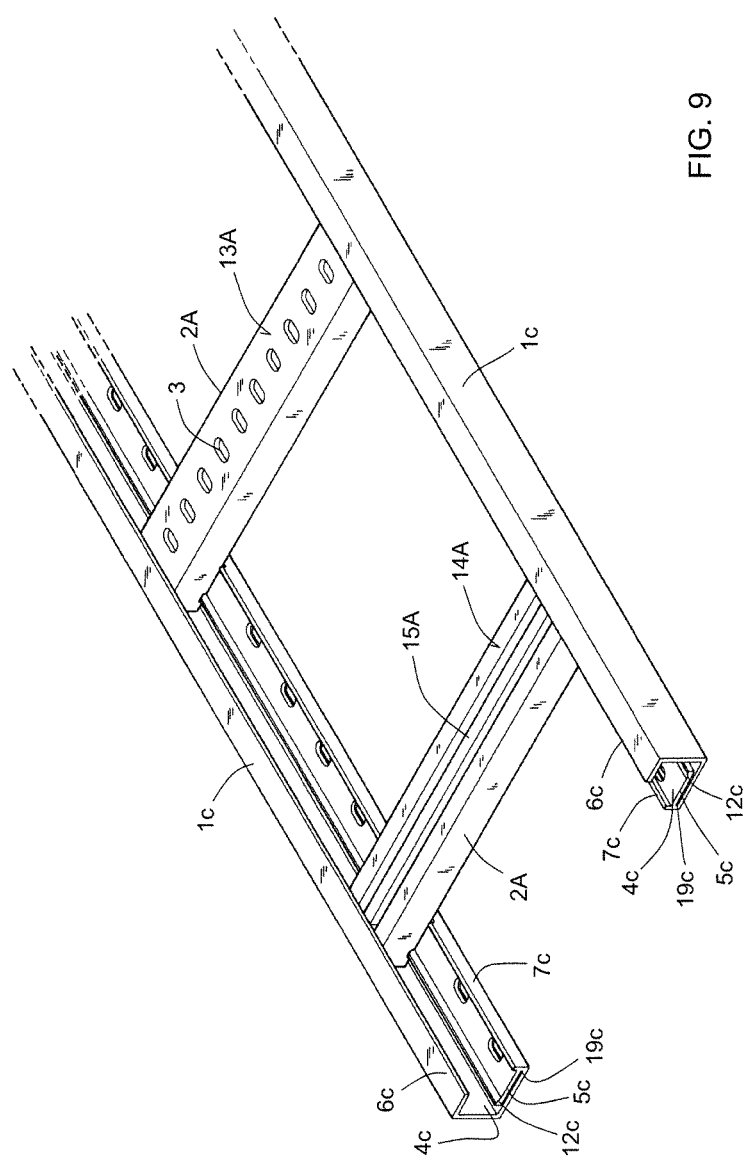
FIG. 9 is a view corresponding to that of FIG. 8, with the cable ladder in an assembled position.
Figure 10:
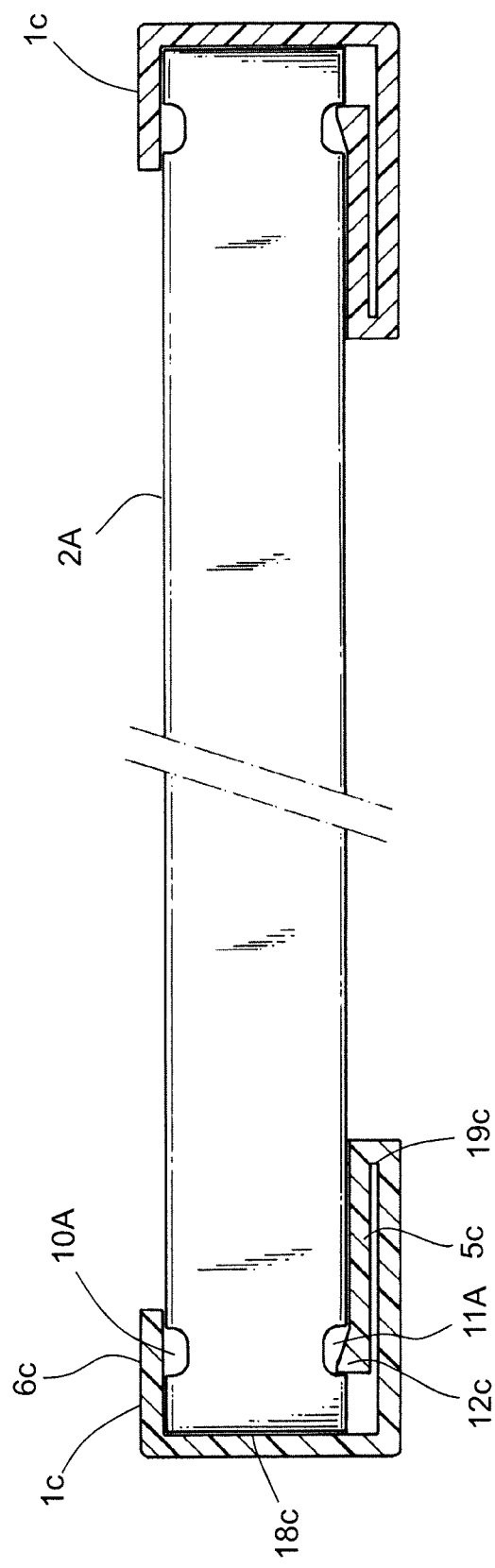
FIG. 10 is a profile view of the third embodiment of the cable ladder, in which the side rails have been depicted sectioned along a plane going through the central axis of a crosspiece.

FIGS. 8 to 10 show a third embodiment having the same general configuration as the first embodiment: the cable ladder is formed by two identical side rails 1c placed symmetrically with respect to one another, and a plurality of identical crosspieces 2A, all of them being extruded PVC profiles. The crosspieces 2A are the same as in the first embodiment, only the side rails 1c are different. In the drawings, the elements of the side rails 1c similar to those of the side rails 1a of the first embodiment are designated with the same reference numbers but with the suffix "c" instead of "a". The differences with respect to the first embodiment are as follows:

in the channel 4c of the side rails 1c, the upper rib 6c does not have a projection, whereas the projection 7c formed at the end of the lower rib 5c is located at the level of the bending line 19c and is interrupted by the openings 9c;

the bending line 19c is in a protruding position towards the other side rail 1c, such that the final free end section of the lower rib 5c extends from said bending line 19c away from said another side rail 1c;

the portion of the channel 4c of the side rail which is snap-fitted in the recess 10A, 11A of the crosspiece 2A is a protuberance 12c formed inside said channel 4c, particularly at the end of said final free end section of the lower rib 5c.

It will be observed that like in the first embodiment, in this third embodiment the crosspiece 2A can be arranged in two positions turned 180° with respect to one another. In each of these two positions, the end of the crosspiece 2A fits and is snap-fitted into the channel 4c of the corresponding side rail 1c. Particularly, in each of these two positions, one and the same portion of the channel 4c, specifically the protuberance 12c, is snap-fitted in the groove forming the recess 10A or in the groove forming the recess 11A, according to the position of the crosspiece 2A. The end of the side rail 1A is securely snap-fitted into the channel 4c as a result of the final free end section of the lower rib 5c applying an elastic force on the corresponding side of the side rail 2A, pushing the opposite side of said side rail 2A against the upper rib 6c of the channel 4c.

In all the embodiments, both the side rails 1a, 1b, 1c and the crosspieces 2A, 2B are extruded profiles in which different functional elements, such as through holes 3, recesses 10A, 10B, 11A, windows 16, openings 9a, 9b, 9c, as well as other functional elements, such as through holes in the side rails 1a, 1b, 1c, for example, for the fixing thereof to other structures, have been made by machining after extrusion.

In addition to the differences described between the side rails 1a, 1b, 1c, it will be observed in the drawings that there are other differences in the portions thereof that do not interact with the ends of the crosspieces 2A, 2B. These other differences do not have a direct relation with the invention and therefore have not been described in detail. Particularly, it will be observed that the side rails may have an upper portion, such as in the side rail 1a, intended for supporting a cover or other complements for the cable ladder, or they may not have said upper portion, as is the case of side rails 1b and 1c.

The invention claimed is:

1. A cable ladder comprising:

two parallel side rails attached to one another by a plurality of parallel crosspieces spaced from one another, said plurality of crosspieces forming a discontinuous support surface for cables, wherein each of said crosspieces is an extruded profile made of a polymer material, wherein each of said side rails is an extruded profile made of a polymer material having, on an inner side thereof facing the other side rail, a channel receiving a corresponding end of said crosspiece, wherein said channel is demarcated by a lower rib and an upper rib, said lower rib or said upper rib having at an end thereof a projection extending towards an inside of said channel, and a plurality of openings spaced from one another along a longitudinal direction of said side rails being formed in one of said projections, wherein each of two ends of each of said crosspieces is formed such that each end goes through one of said openings in the projection of the corresponding side rail and tightly fits in said channel of said side rail, wherein said channel in the inner side of each side rail and the two ends of each of said crosspieces are formed such that each of said ends fits and is snap-fitted into said channel of the corresponding side rail, wherein each of said ends of said crosspieces is provided with at least one recess in which a corresponding portion of said channel of the side rail is snap-fitted, and wherein and said lower rib of said side rails is bent over itself along a bending line, such that a final section of said lower rib is a free end section which undergoes a slight lowering by elastic bending with respect to said bending line, said slight lowering by elastic bending widening said channel of the side rail during introduction of the corresponding end of the crosspiece.

2. The cable ladder according to claim 1, wherein said recesses at each of the ends of the crosspiece include a groove traversing said crosspiece.

3. The cable ladder according to claim 1, wherein said portion of the channel of the side rail which is snap-fitted in said recess is one of said projections of the lower rib or of the upper rib of the channel of the side rail.

4. The cable ladder according to claim 3, wherein said crosspieces are provided with through holes for receiving a cable fastener.

5. The cable ladder according to claim 4, wherein said crosspieces are provided with a hollow longitudinal rail open on a first side of said crosspiece.

6. The cable ladder according to claim 5, wherein said through holes are on an opposite side with respect to said first side of said crosspieces.

7. The cable ladder according to claim 6, wherein the two ends of each of said crosspieces are formed to fit and are snap-fitted into said channel of the corresponding side rail, both in a first position of said crosspiece and in a second position in which said crosspiece is turned 180° with respect to said first position.

8. The cable ladder according to claim 7, wherein each end of said crosspieces comprises two of said recesses: a first recess of which is on the first side of the crosspiece and a second recess on the second side of the crosspiece opposite said first side, said first recess and said second recess being formed such that said portion of the channel of the side rail is alternately snap-fitted in each of them, when said crosspiece is alternately located in said first position or in said second position.

9. The cable ladder according to claim 6, wherein each end of said crosspieces comprises a window formed on the opposite side of said crosspiece, one of said recesses being arranged on the first side of said crosspiece, and said projection in the lower rib of said side rails has two of said openings demarcating between them a finger which is snap-fitted in said window.

10. The cable ladder according to claim 1, wherein said portion of the channel of the side rail which is snap-fitted in said recess is a protuberance formed inside said channel of the side rail.

11. The cable ladder according to claim 10, wherein said protuberance is formed at an end of said free end section of the lower rib.

12. The cable ladder according to claim 1, wherein a bottom of said channel of the side rails forms an inner wall on which the end of the corresponding crosspiece is supported when it is fitted and snap-fitted into said channel.

13. The cable ladder according to claim 1, wherein in each of said two side rails said bending line is in a protruding position in opposite direction with respect to the other one of said two side rails, such that said free end section of the lower rib extends from said bending line towards said another side rail.

14. The cable ladder according to claim 1, wherein in each of said two side rails said bending line is in a protruding position towards the other one of said two side rails, such that said free end section of the lower rib extends from said bending line away from said another side rail.

* * * * *